United States Patent [19]
Hendriks

[11] Patent Number: 5,374,223
[45] Date of Patent: Dec. 20, 1994

[54] TRANSVERSE ELEMENT FOR AN ENDLESS TRANSMISSION UNIT

[75] Inventor: Emery F. M. Hendriks, Nr Heeze, Netherlands

[73] Assignee: Van Doorne's Transmissie B.V., Tilburg, Netherlands

[21] Appl. No.: 106,959

[22] Filed: Aug. 17, 1993

[30] Foreign Application Priority Data

Sep. 17, 1992 [NL] Netherlands ............... 9201608

[51] Int. Cl.⁵ ............................................. F16G 1/22
[52] U.S. Cl. ............................................. 474/242
[58] Field of Search .............. 474/201, 240–245, 474/265

[56] References Cited

U.S. PATENT DOCUMENTS 4,826,473 5/1989 Miyawaki ............ 474/242 X

FOREIGN PATENT DOCUMENTS 0203852 3/1986 European Pat. Off. .
0298258 11/1989 European Pat. Off. .
0460721 11/1991 European Pat. Off. .
430142 9/1911 France .
58-81252 5/1983 Japan .

Primary Examiner—Michael Powell Buiz
Attorney, Agent, or Firm—Young & Thompson

[57] ABSTRACT

A transverse element for an endless transmission unit, which transmission unit comprises one or more carriers having transverse elements slidably disposed thereon, the transverse element being provided with coupling elements and also a tilting zone on at least one of the two main sides of the transverse element. According to the invention, the coupling elements and the tilting zone are integrated in a universal joint.

13 Claims, 2 Drawing Sheets

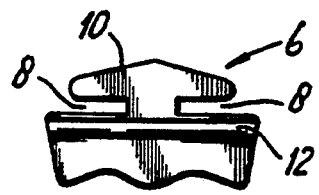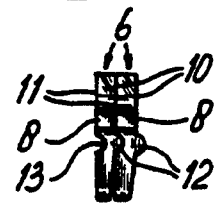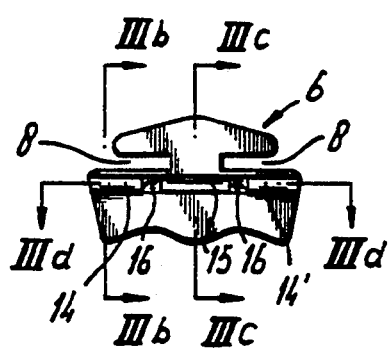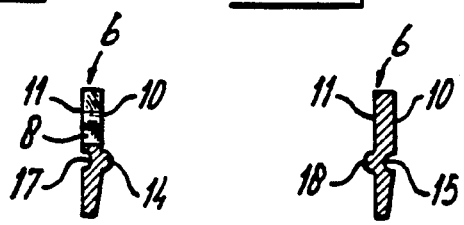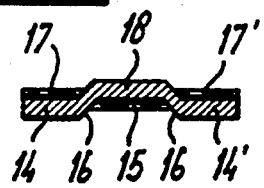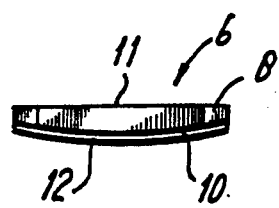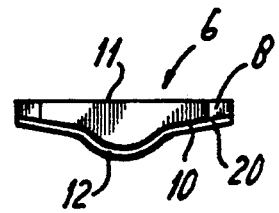

TRANSVERSE ELEMENT FOR AN ENDLESS TRANSMISSION UNIT

FIELD OF THE INVENTION

The invention relates to a transverse element for an endless transmission unit, which transmission unit comprises one or more carriers having transverse elements slidably disposed thereon, the transverse element being provided with coupling means and also a tilting zone on at least one of the two main faces of the transverse element.

BACKGROUND OF THE INVENTION

Such a transverse element for an endless transmission unit is used, inter alia, in continuously variable transmissions for, for example, vehicles and is known as such from European Patent Specification 0,014,013.

The known transverse element has a separate tilting zone which permits bending of the endless transmission unit, in particular in the pulleys of the continuously variable transmission, and coupling means. The coupling means generally comprise a stud on one main face and a recess on the other main face, the stud and recess of adjacent transverse elements being in engagement with each other, in particular in the straight parts between the pulleys of the continuously variable transmission, so that a stable positioning of the transverse elements relative to each other in said straight parts is obtained. If the coupling means are fitted slightly above the tilting zone, they are released during a curve of the endless transmission unit in the pulleys, so that the transverse elements can assume the optimum position there.

The known transverse elements and the endless transmission unit assembled therefrom function well per se, but the positioning of the individual transverse elements and of the transverse elements relative to the pulleys and the carriers is not always ideal and precise. This is caused in particular through the fact that this positioning is determined both by the tilting zone and the coupling means. Besides, the links have a tendency to shift slightly relative to each other instead of rolling at the position of the tilting zone. This means that the load on, the wear and the ease of positioning of said parts and the efficiency of the transmission are not ideal. Moreover, the known transverse element is complicated to manufacture.

SUMMARY OF THE INVENTION

The object of the invention is to provide an improved transverse element which is easier to position and more stable. For this purpose, the invention is characterized in that the coupling means and the tilting zone are integrated in a universal joint. This makes the transverse element according to the invention easier to position, because the positioning is determined by the universal joint. The transverse elements in this case roll at the position of the universal joint, in order to permit bending of the endless transmission element.

According to a further development of the invention, the universal joint comprises at least one ridge in one main side and a corresponding groove in the other main side. The ridge/groove combination makes optimum rolling of the transverse elements possible and ensures precise positioning.

The groove can also be slightly wider than the ridge, or said ridge or groove can extend over the full width of the transverse element. If desired, the transverse elements can consequently move sideways relative to each other, which is desirable in particular for those applications in which the two pulleys are not completely aligned and the endless transmission unit is running at a slight angle.

According to a further characteristic, at least two ridges can be provided in one main side, with a groove between them, and at least two grooves can be provided in the other main side, with a ridge between them. A transition from a ridge and adjoining groove situated in the same plane preferably has a slanting boundary in this case. This makes the groove/ridge combination self-locating and ensures good mutual positioning.

The ridge and/or the groove according to the invention are preferably semi-circular in shape. The radius in this case can advantageously lie between 0.2 and 2 mm, and is preferably 0.5 mm. This shape of the groove and the ridge promotes rolling of the transverse elements relative to each other, and the positioning in the other directions is also ensured.

According to a further development of the invention, at least one of the two main faces is at least partially profiled in at least the crosswise direction, and is preferably convex. The groove and/or the ridge can be correspondingly profiled in this case. The radius of the profiled surface is in this case advantageously chosen between 1 and 10 meters, and is preferably 2 meters. The profiled surface means that the transverse elements can also roll laterally to some extent, which is desirable in particular for applications in which the two pulleys of the continuously variable transmission are not fully aligned and the endless transmission element has to run at a slight angle.

According to a further characteristic, the main face and/or the ridge is partially convex in the center. The convex part in this case can merge into a slanting part.

The invention also relates to an endless transmission unit provided with one or more transverse elements according to the invention.

BRIEF DESCRIPTION OF THE DRAWINGS

The invention will be explained with reference to a drawing, in which:

FIG. 2 shows a transverse element according to the invention, in front view (a) and side view (b);

FIGS. 3a–3d shows a transverse element according to the invention provided with several ridges and grooves, in front view (a), in cross-section IIIb—IIIb, in cross-section IIIc—IIIc and in cross-section IIId–IIId;

FIG. 4 shows a top view of the transverse element shown in FIG. 2, in which the main face and the ridge are convex in the crosswise direction;

FIG. 5 shows a top view of the transverse element shown in FIG. 2, in which the center parts of the main face and of the ridge are convex and slope to the sides.

DETAILED DESCRIPTION OF THE INVENTION

Figure 1:
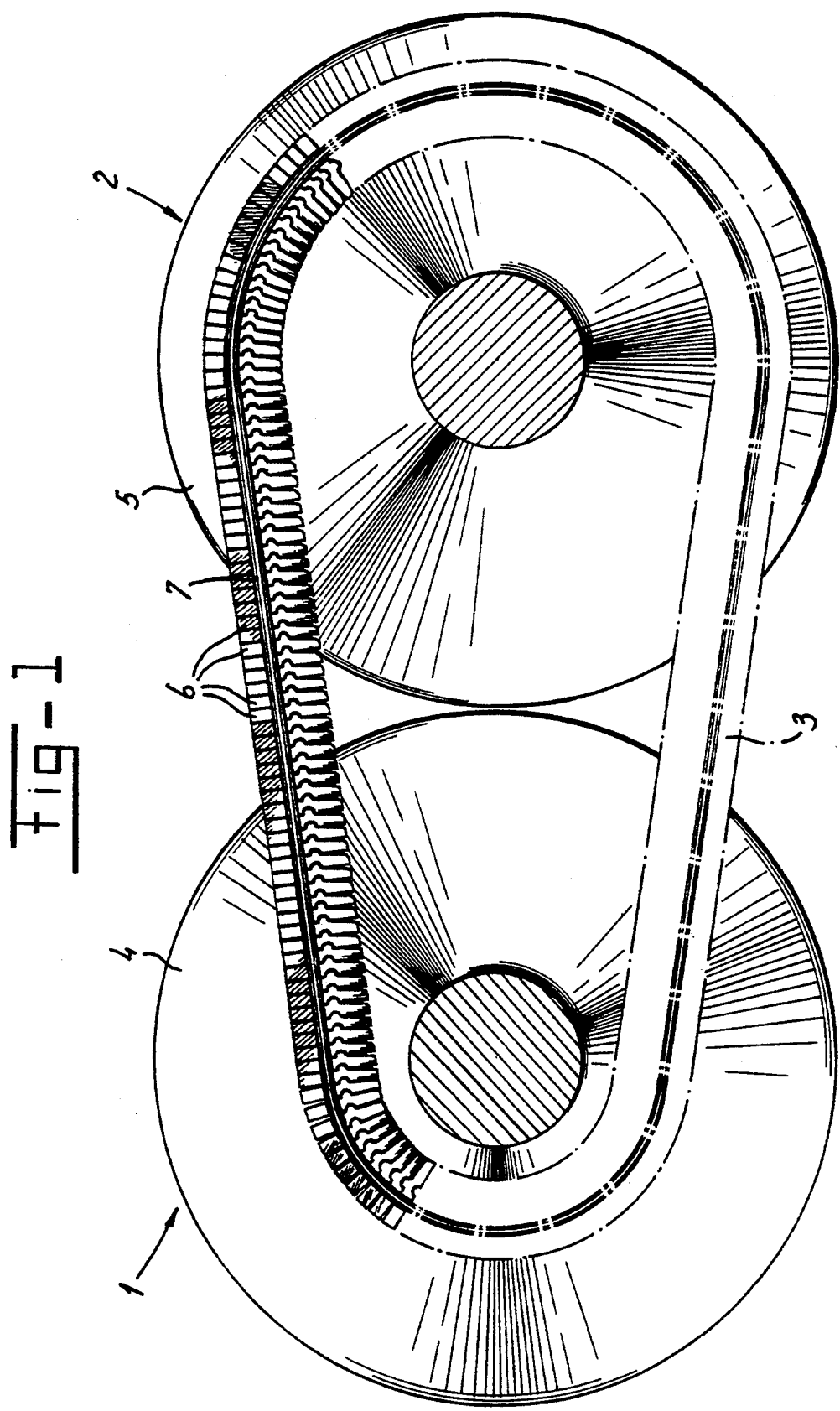
FIG. 1 shows a diagrammatically illustrated continuously variable transmission.

The continuously variable transmission shown in FIG. 1 comprises two pulleys 1, 2, with an endless transmission unit 3 fitted around them. The endless transmission unit 3 in this example is provided with carriers 7 having transverse elements 6 disposed slidably thereon.

The transverse elements 6 can be of a type in the case of which only one carrier 7 can be accommodated, but they can also be of a type in the case of which two or more carriers 7 can be accommodated. The carrier or carriers 7, for their part, can comprise one or more stacks of endless elements.

FIG. 2a shows a transverse element 6 of the type in the case of which two carriers 7 can be accommodated in the lateral openings 8. In order to illustrate the invention further, two of said transverse elements 6 are placed with their main faces 10, 11 against each other in FIG. 2b in side view. The main side 10 may run radially inwards at a slight angle to main side 11. This supports the bending of the endless transmission unit B, but is not absolutely necessary for this purpose. A ridge 12 is provided on the main side 10, while a complementary groove 13 is formed in main side 11. In the assembled state shown in FIG. 2b, ridge 12 extends into groove 13, forming a universal joint. The ridge 12 and the groove 13 make rolling of the transverse elements 6 relative to each other possible during bending of the endless transmission unit between the pulleys. The ridge 12 and the groove 13 also ensure precise positioning of the transverse elements 6.

FIG. 2a shows an embodiment of the transverse element 6 according to the invention in which the ridge 12 and the groove 13 are provided over the full width of the transverse element 6. This is advantageous in particular when a certain relative lateral movement of the transverse elements 6 is desirable. Furthermore, the same effect can be achieved to a greater or lesser extent by making the ridge narrower than the groove 13.

It may, on the other hand, be desirable for the transverse elements also to be fixed relative to each other in the lateral direction. This can be achieved, inter alia, by the embodiment shown in FIG. 3, in which two ridges 14, 14' with a groove 15 between them are provided on the main face 10. Two grooves 17, 17' with a ridge 18 between them are provided on the other main side 11. This makes the main sides 10 and 11 complementary, while in this embodiment the transverse elements cannot shift laterally relative to each other. Furthermore, in the embodiment shown in FIG. 3 the boundary between the ridges 14, 14', 18 and the adjoining grooves 15, 17, 17' are made slanting, with the result that the coupling between ridges and grooves is self-seeking and a good coupling is ensured.

The ridges and grooves in the embodiments of the figures shown are preferably semi-circular in shape, a radius of between 0.2 and 2 mm, and of 0.5 mm in particular, being suitable for the curvature.

In the embodiment shown in FIG. 4, the main face 10 of the transverse element 6 is convex in the crosswise direction. The ridge 12 situated on the main face 10 is correspondingly convex in the crosswise direction. This makes it possible for the transverse elements 6 also to roll laterally. An advantageous radius for the construction of the convex main side lies between one and ten meters, and is preferably two meters.

In a further development of this inventive idea shown in FIG. 5, the main face 10 and the ridge 12 are convex only in the center part in the crosswise direction, which convex part ends laterally in slanting parts 20. The slanting parts preferably have an angle of gradient between 0.01° and 0.15°, and in particular 0.05°.

It will be clear that the invention is not limited to the embodiments shown and that many variants which are considered to fall within the inventive idea are conceivable within the scope of the invention. For example, two spatially separated ridges may be disposed on one main side, while two complementary, spatially separated grooves are provided in the other main side. The ridges and grooves may in this case - but also in other embodiments - have any desired profiles in front view, for example a round profile.

I claim:

1. Transverse element for an endless transmission unit, which transmission unit comprises one or more carriers having transverse elements slidably disposed thereon, the transverse element having two main sides and being provided with coupling means and a tilting zone on at least one of the two main sides, said coupling means and tilting zone being integrated in a universal joint comprising at least one ridge in one main side and a corresponding groove in the other main side, said groove extending over the full width of the transverse element.

2. Transverse element according to claim 2, wherein the groove in one main side is wider than the ridge in the other main side.

3. Transverse element according to claim 1, wherein the ridge extends over the full width of the transverse element.

4. Transverse element according to claim 1, wherein at least two ridges are provided in one main side, with a groove between them, and at least two grooves are provided in the other main side, with a ridge between them.

5. Transverse element according to claim 4, wherein a transition from a ridge and adjacent groove situated in the same plane has a slanting boundary.

6. Transverse element according to claim 1, wherein the ridge and/or groove are semi-circular in shape, and the radius of the semi-circular ridge and/or groove lies between 0.2 and 2 mm.

7. Transverse element according to claim 1, wherein at least one of the two main sides is profiled in at least a crosswise direction, and the groove and/or the ridge are at least partially profiled correspondingly to the main side in which the groove and/or the ridge are provided.

8. Transverse element according to claim 7, wherein at least one of the two main sides is at least partially convex.

9. Transverse element according to claim 8, wherein the convex part has a radius which lies between one and ten meters.

10. Transverse element according to claim 8, wherein the main side with the groove provided therein is flat, and the main side with the ridge is at least partially convex.

11. Transverse element according to claim 1, wherein at least one main side and the ridge and/or groove are convex in a central part.

12. Transverse element according to claim 11, wherein the convex central part merges laterally into a slanting part.

13. Transverse element according to claim 12, wherein the slanting part forms an angle of gradient between 0.01° and 0.15°.

* * * * *